(12) United States Patent
Cohen et al.

(10) Patent No.: US 7,326,277 B1
(45) Date of Patent: Feb. 5, 2008

(54) BRAKE AIR DRYING USING LOW PRESSURE DESICCANT WHEEL

(75) Inventors: Alan P. Cohen, Highland Park, IL (US); Stephen R. Dunne, Algonquin, IL (US); Rustam H. Sethna, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 524 days.

(21) Appl. No.: 10/823,827

(22) Filed: Apr. 14, 2004

(51) Int. Cl.
B01D 53/06 (2006.01)

(52) U.S. Cl. .......................................... 95/113; 96/125

(58) Field of Classification Search .................. 95/113, 95/125; 96/125, 150
See application file for complete search history.

(56) References Cited

U.S. PATENT DOCUMENTS

| | | | |
|---|---|---|---|
| 4,707,166 A | 11/1987 | Khosropour | 55/213 |
| 5,683,532 A | 11/1997 | Kuma | 156/184 |
| 5,779,772 A | 7/1998 | Unger et al. | 96/137 |
| 5,851,269 A | 12/1998 | Strope | 96/144 |
| 5,867,918 A | 2/1999 | Deike et al. | 34/71 |
| 6,050,651 A | 4/2000 | Thomas | 303/86 |
| 6,294,000 B1* | 9/2001 | Klobucar | 95/113 |
| 6,358,291 B1 | 3/2002 | Koenig et al. | 55/312 |
| 6,391,098 B1* | 5/2002 | Thomas | 96/111 |
| 6,406,523 B1 | 6/2002 | Connor et al. | 96/125 |
| 6,425,935 B1 | 7/2002 | Amato et al. | 95/1 |
| 6,557,365 B2* | 5/2003 | Dinnage et al. | 62/271 |
| 6,571,489 B2 | 6/2003 | Larsson et al. | 34/330 |
| 6,581,297 B1 | 6/2003 | Ginder | 34/79 |

* cited by examiner

Primary Examiner—Robert A. Hopkins
(74) Attorney, Agent, or Firm—Mark Goldberg

(57) ABSTRACT

The invention comprises a temperature swing adsorption system for providing dry air to an air brake system. More particularly, there is provided a desiccant wheel upstream of the air compressor to dry air prior to its compression.

6 Claims, 3 Drawing Sheets

BRAKE AIR DRYING USING LOW PRESSURE DESICCANT WHEEL

FIELD OF THE INVENTION

The present invention relates to the use of an adsorbent wheel in a temperature swing adsorption system to dry brake air. This invention is useful in the air brake systems of trucks and some other large vehicles.

BACKGROUND OF THE INVENTION

Compressed air systems are widely used to operate a number of devices, and find particular use in braking systems for heavy vehicles. These systems include an air compressor which compresses ambient air and charges a storage reservoir. The compressor is engine operated and a governor or controller, responsive to the reservoir pressure, selectively enables or disables the compressor as needed. Air dryers commonly employ a drying material or desiccant through which air passes to remove moisture and limit problems associated with moisture entering brake system components. Moisture is adsorbed by the desiccant and removed from the compressed air before it is transported to the storage reservoir. In these known systems, periodic or cyclic purging of the air dryers is required in order to purge or regenerate the desiccant. A typical air brake drying system in present day trucks functions as follows: Ambient air is drawn in through the engine air filter, which removes particulate contaminants. The air then enters the suction side of a turbocharger or super charger, which boosts the pressure to about 103 kPa (15 psig). An intercooler is used to cool the air. Most of the boosted air then enters the engine intake, but a portion of it (typically 12 SCFM, but varying according to the engine speed) flows to the air compressor. The compressor increases the pressure from about 103 kPa (15 psig) to the system pressure of about 793 to 896 kPa (115 to 130 psig). The compressed air leaving the compressor has been heated by the compression process and as a result is capable of holding a relatively large amount of water. As the air cools in the system, it loses its capability to retain as much moisture, which results in the formation of liquid water in the system. This moisture and other contaminants can be detrimental to the system in that freezing or sludge buildup can occur. Excessive moisture can also wash away needed lubricants in the valves and other air system components. Most commercial trucks, tractors and buses use some form of air dryer to remove the unwanted moisture and contaminants from the air brake system. The most common air dryers in use today are of the desiccant variety. In a desiccant air dryer, some water condenses before it reaches the desiccant and remaining water molecules are adsorbed by the desiccant material within the air dryer. The moisture is retained by the desiccant material until a quantity of dry expanded air is flowed over the desiccant to regenerate the desiccant. If there is too long a period before regeneration occurs, then the desiccant will become saturated and the air dryer effectively stops functioning. The type of air dryer employed is a pressure swing dryer. After being dried in the pressure swing dryer, the compressed air flows to a supply tank and system reservoirs.

Most vehicles have a single cartridge air dryer. This dryer works intermittently along with the compressor cycles. During the compressor load cycle (when the compressor is running), the single dryer is adsorbing moisture from compressed air. During the compressor unload cycle, when it is idle, the dryer is taken off of adsorption and the depressurization and desorption purge steps occur. The purge gas can come from one of three places. The purge gas can be stored during adsorption in a separate pressure tank external to the dryer. It can be stored in a volume integral to the dryer or desiccant cartridge itself. It can come from the supply reservoir of the compressed air system.

In those systems that have a twin cartridge or two bed air dryer, as the compressor is working, one bed is on adsorption and the other bed is on desorption. The two beds periodically switch from adsorption to desorption and back again. The twin bed dryer has the ability to operate continuously in a pressure swing adsorption cycle, although flow through the dryer stops during the compressor unload cycle, when the compressor is idle. Compressed air enters the dryer bed on adsorption and the dried air exits the bed. A portion of the dried air is used for continuously purging the bed on regeneration. The balance of the air is supplied to the brakes and other pneumatic accessories. The cycle may be timed, so that after a given amount of air has been dried, the beds switch or the switching of the beds may be triggered by the supply reservoir reaching its upper set point pressure.

In the current state of the art systems, in both the single and the double bed systems, a portion of the dried compressed air must be used for purging the desiccant bed and this purge air is not available for operating the brakes and other pneumatic equipment.

The performance of pressure swing air dryers is limited by the mass of purge air available on each cycle. The amount of purge air is often expressed as the purge-to-feed ratio (purge/feed ratio), which is the mass fraction or percentage of the compressed air that is used for regeneration. The minimum purge/feed ratio for most applications is normally about 15 to 25%. Increasing the purge/feed ratio improves drying performance by stripping water to a lower residual level, especially at the adsorption outlet end of the bed, producing a lower dry air dew point. The cost of increasing the purge/feed ratio and achieving lower dew point air is a reduced recovery, defined as air supplied to the brakes divided by air fed to the dryer, or equivalently, 1−(purge/feed). The higher the purge/feed ratio, the lower is the air recovery and the higher is the cost of operating the compressed air system in terms of fuel consumption. Also, the higher the purge/feed ratio, the larger is the compressor needed to supply a given air demand.

The compressor runs intermittently in cycles determined by the filling and depletion of the air in the system reservoirs. The compressor pumps until the pressure in the supply tank reaches the cut-out pressure (the upper set point), for example, 896 kPa (130 psig). Then the compressor rests until the pressure in the supply tank falls to the cut-in pressure (the lower set point), for example 690 kPa (100 psig). The lower set point is reached due to air usage by the brake systems, by other pneumatic equipment, and the regeneration (purging) of the dryer.

SUMMARY OF THE INVENTION

Figure 1:
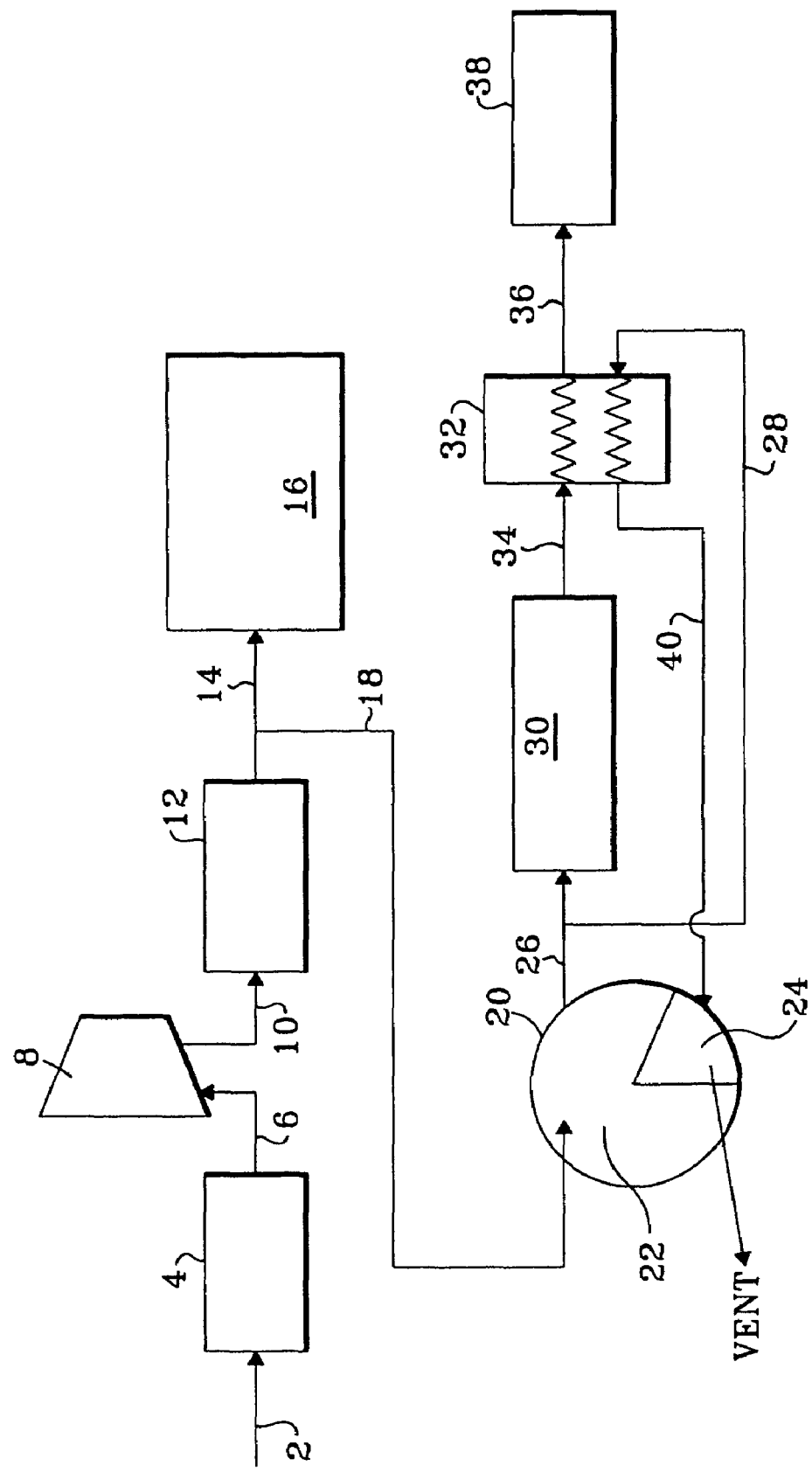
FIG. 1 shows a desiccant wheel air brake dryer together with other components of a truck or other large vehicle having an air brake system.

The present invention comprises an air brake system comprising a source of fresh air communicating with a desiccant wheel. The desiccant wheel comprises an axis of rotation, a radius perpendicular to said axis of rotation extending from said axis of rotation to an outer circumference, and two faces. The two faces of the desiccant wheel are divided into at least two sectors. The sectors comprise at least an adsorption sector and a regeneration sector. Fresh air passes through the adsorption sector to be dried and a source of heated gas is sent to the regeneration sector to remove water from the desiccant wheel. The air brake system further comprises an air compressor to compress the fresh air to a desired level.

Another embodiment of the present invention comprises an air brake dryer for a braking assembly comprising a desiccant wheel comprising an axis of rotation, a radius perpendicular to said axis of rotation extending from said axis of rotation to an outer circumference, and two sides. The two sides are divided into at least two sectors with the sectors comprising an adsorption sector and a regeneration sector. The adsorption sector is contacted with a moist flow of air that passes through the adsorption sector. The adsorption sector comprises an adsorbent material to remove water from the air to produce dry air. Heated air contacts the regeneration sector to remove water. The dry air passes to an air compressor that compresses said dry air to a desired pressure level.

The present invention further comprises a process for producing dry compressed air for a vehicle's air brakes comprising sending a flow of air to a vehicle air inlet and then sending the flow of air through an adsorption sector of a desiccant wheel to produce a flow of dry air. Then the flow of dry air is sent to an air compressor to produce a supply of compressed air. The supply of compressed air is stored for use in applying said vehicle's air brakes. A flow of heated air is sent to the regeneration sector of the desiccant wheel to desorb the moisture that has been adsorbed thereon. In a preferred embodiment of the invention, this flow of heated air is heated by the heat of compression resulting when the supply of compressed air is produced.

DETAILED DESCRIPTION OF THE INVENTION

In the present invention, a desiccant wheel is located upstream of the air compressor to dry the brake air and eliminate the pressure swing dryer. Similar to the prior art, ambient air is drawn in through the engine air filter, which removes particulate contaminants. The air then enters the suction side of a turbocharger or super charger, which boosts the pressure to about 103 kPa (15 psig). An intercooler is used to cool the air. Most of the boosted air then enters the engine intake, but a portion of it (nominally 12 SCFM, but varying according to the engine speed) flows to the air compressor and then to the braking system.

Prior to entering the air compressor, the pressure boosted air flows through the adsorption sector of a desiccant wheel. Most of the dried air from the wheel then flows to the air compressor suction. However, a slipstream portion of the dried air is separated and used for regeneration of the wheel. This slipstream portion flows through a heat exchanger which has been placed on the compressor discharge. Some of the heat of compression in the discharge air is thus recovered to heat the slipstream portion, which then flows through the regeneration sector of the desiccant wheel in a direction countercurrent to the adsorption flow direction. The spent regeneration air can be discharged to the atmosphere.

The desiccant wheel used in the present invention is of an appropriate size and is rotated at an appropriate speed to allow for adsorption of the bulk of the water in the inlet air. The wheel is regenerated by a hot dry air flow. In order to conserve energy, it is preferable to heat the regeneration air flow with existing heat found in the vicinity of the engine. One particularly advantageous source of heat is from the compressor discharge. A flow of air that becomes the regeneration air flow can be sent through a heat exchanger that is heated by the air heated by passing through the compressor. The regeneration sector of the desiccant wheel and the regeneration air flow are sized as appropriate to remove moisture from the adsorbent on the desiccant wheel. Since the regeneration air flow significantly heats the regeneration sector of the adsorbent wheel, it is necessary to cool the adsorbent wheel surface in order for there to be effective functioning of the adsorption sector in removing moisture. In some configurations, it is possible to have the wheel cooled by the flow through the adsorption sector. However, in a preferred embodiment of the invention, a relatively small portion of air is passed through a cooling sector of the wheel to optimize the temperature of the desiccant wheel prior to passage of the air through the adsorption sector of the desiccant wheel. The desiccant wheel rotation may be stopped during the time periods when the compressor is idle. The desiccant used in the desiccant wheel is selected to have the appropriate isotherm in adsorption of water. The adsorbents that may be used in the present invention include dealuminated Y zeolite, DDZ-70, silica gel and activated alumina. Y-74 molecular sieve product sold by UOP LLC, Des Plaines, Ill. is particularly effective in the present invention.

Similar to the prior art systems, the air compressor operates intermittently. A controller turns the compressor on to supply compressed air as long as the pressure in the supply reservoir is below the set pressure. When the set pressure is reached, the controller shuts down the compressor. During the period that the compressor is shut down, dried air is no longer needed and the compressor does not draw in air at its suction. A valve can be used to prevent the pressure boosted air from flowing out of the system through the wheel and the regeneration line. A controller can receive the pressure reading from the supply reservoir, turning the compressor and desiccant wheel drive on or off and opening or closing the valve. There are several different types of rotary contactors that may be used in the present invention. One type of rotary contactor or wheel has a central hub and a casing. Between hub and casing is provided a media capable of regeneration or paperboard material having desiccant dispersed therein for removing moisture from the process air stream.

Often rotary adsorbers are used in non demanding applications like HVAC enthalpy recapture where leakage from one stream to another is not critical to the performance. In these high pressure applications the possibility of leakage is greater because of the high pressure and the effect of the leakage can be great when the product needs to be of high purity compared to the feed.

Therefore, the seals around the rotary adsorber can be important for the functioning of the process, such as those known in the prior art. In U.S. Pat. No. 6,406,523, incorporated herein in its entirety, a rotary adsorber is disclosed which can be used to make adsorptive separations using pressure swing regeneration. Other rotary adsorbers can be used if the sealing of the rotating surfaces is adequate. There are many other types of seals known in the art, often providing multiple sealing surfaces to minimize the leakage at the moving faces.

In another embodiment of the invention, the media is fabricated by providing alternating layers of flat and corrugated paperboard that are positioned to provide a multiplicity of open-ended passages parallel to the axis of rotation to permit air to flow there through. Typically, the media is formed by winding a web of corrugated paperboard (having a flat sheet of paperboard bonded to one side) about the hub until a multi-layered media is built up that extends to the outer casing. The corrugated paperboard having one side flat is made by bonding or positioning a flat strip of paperboard over a corrugated strip of paperboard. The width of the strip determines the width of the wheel, and the edges of the paperboard forms the faces of the wheel. It should be understood other fabrication techniques that form passages may be used.

The media or paperboard for the wheel can be comprised of a fibrous material and any material that operates to remove moisture from an air stream such as process air on a continuous basis. The wheel is formed from a paperboard comprising thermally stable fibrillated synthetic organic or inorganic fibers and an adsorbent material selected for the particular application as previously described herein.

Fibrillated organic fibers, because of their strength and ability to interlock, provide suitable reinforcement at levels as low as 15% by weight of the total desiccant paperboard. A number of different organic and inorganic fiber materials may be used for the desiccant paper for the desiccant wheel, depending upon the temperatures at which the desiccant wheel is regenerated. For example, inorganic fibers such as fine-diameter fiberglass, mineral wool, or other ceramic materials, may be employed. Although such fibers are stable over a wide range of temperatures, they can suffer from cracking during the paper corrugation stage. Natural organic fibers such as cotton may also be used, although they are limited in regeneration temperature. Synthetic organic fibers useful in the invention are those comprising high-density polyethylenes, high-density polypropylenes, aromatic polyamides (i.e., aramids), polystyrenes, aliphatic polyamides, poly(vinyl chlorides), acrylics, acrylonitrile homopolymers, copolymers with halogenated monomers, styrene copolymers, and mixtures of polymers (e.g., polypropylene with low-density polyethylene, and high-density polyethylene with polystyrene).

However, due to its strength, light weight and temperature resistance, the preferred organic fiber for the desiccant wheel of the present invention is selected from aramids. The aramids are manufactured fiber in which the fiber-forming substance is a long-chain synthetic polyamide in which at least 85% of the amide (—CO—NH—) linkages are directly attached to the two aromatic rings. Such aramid fibers are available from DuPont under the trademark KEVLAR®. KEVLAR is commercially available as a refined pulp designed for paper forming, such as KEVLAR 303 pulp. During refining, the KEVLAR fiber shafts are split at the ends into fibrils by means of application of high shear, thereby creating a tree-like structure. In the manufacture of paperboard, it has been discovered that the fibrils interlock to enhance the paperboard strength. KEVLAR is stable in oxidizing atmospheres up to 450° C. Other high-temperature resistant aramids such as NOMEX®, available from DuPont, is suitable for formation of paperboard in the present invention. However, it is preferred that such fibers are refined or fibrillated in a similar manner.

In one process for manufacturing the adsorbent wheels as used in the present invention, KEVLAR 303 pulp having fiber shafts that are approximately 12 μm in diameter and up to 4 mm in length is first dispersed to form an aqueous slurry. The slurry is then fed to a disc or other high-shear refiner, which is effective in further splitting the fibrillated fiber shafts into additional fibrils. After the refining step, the KEVLAR 303 fiber shafts range from 1 mm to 4 mm in length with fibrils extending therefrom that are as small as 1 μm to 3 μm in diameter.

The adsorbent wheel can be manufactured using the above materials to provide a wheel or body which will readily adsorb moisture contained in ambient air and desorb the resulting moisture from the wheel during a regeneration cycle of short duration. In accordance with the present invention, a continuous rotary contactor (also known as an adsorbent wheel or desiccant wheel in some applications) is employed to dry and otherwise purify a compressed gas stream. A continuous system is thereby provided for the purification of a gas stream that has been compressed and is then employed for its intended application.

The adsorbent wheel may instead be made from a thin substrate (e.g., a 1.3 to 2-mil thick aluminum foil) coated on both sides with a particulate desiccant in a binder matrix (typical coating thickness of about 1 mil on each side). Adsorbent wheels can also be made from other metal foils, polymer films or paper substrates, coated or impregnated with solid adsorbents or deliquescent absorbents. Additionally, the speed at which the wheel is rotated and the mass of the wheel is preferably high relative to the mass of the gas flow being processed to increase the rate at which heat and mass can be transferred from one air stream to the other air stream.

In another embodiment, the adsorbent wheel is a rotary, desiccant coated, aluminum dehumidification wheel. The preferred desiccant-based drying wheel in applications where drying is important, utilizes a desiccant coating optimized to provide the maximum amount of water removal for a given size wheel when operated under the operating conditions. A desiccant used for such a wheel desirably has as high a water adsorption capacity as possible and therefore as much useable desiccant mass on the wheel as is consistent with technical and economic constraints. Furthermore, although non-desiccant mass is required to carry and support the desiccant material, the wheel preferably has as little non-desiccant mass as possible because such mass reduces the wheel's dehumidification efficiency.

Desiccant materials used for embodiments employing desiccant-based wheels may include, for example, A-type, X-type or Y-type molecular sieves and other zeolites, activated alumina, lithium chloride and other deliquescent salts, hydrophobic polymers or other materials capable of adsorbing or absorbing water vapor from an air stream.

Another type of adsorbent wheel that can be used in the present invention includes those described in U.S. Pat. No. 5,683,532, incorporated herein in its entirety. In that patent is disclosed a method of manufacturing an active silica gel honeycomb adsorbing body which has a high efficiency of dehumidification or adsorption of other active gases and a relatively small passing resistance of gas in small channels. The conditions change depending upon the size of the small channels of the rotor, the size and the surface area of silica gel micropores and so on. An active silica gel honeycomb adsorbing body which has a high adsorbing rate for humidity, relatively little resistance to pass gases in the small channels and which can be used in an atmosphere having 100% relative humidity can be obtained by limiting a wave length of a single-faced corrugated sheet to approximately 2.5 to 6.5 mm, a wave height to approximately 1.3 to 4.0 mm, the quantity of active silica gel to approximately 0.5 to 3.0 times the weight of the inorganic fiber paper, a main distributing range of a micropore diameter of the produced silica gel to not more than approximately 200 angstroms and a specific surface area of the micropore to 300 to 600 m$^2$/g. The adsorbing body of the present invention can also adsorb and remove odorous materials other than moisture from an inert gas having a relative humidity of not more than 70%. The adsorbing body of the present invention is an adsorbing body obtained by synthesizing silica gel on a matrix of a honeycomb shape made of an inorganic fiber. The adsorbing body adsorbs moisture preferentially in the micropores of the silica gel and the adsorbing body adsorbs other odorous gases in the low relative humidity atmosphere. After the micropores of the adsorbing body are saturated with humidity and other active gases, the device cannot adsorb more adsorbate. Therefore, the adsorbing body can be operated in an atmosphere having 100% relative humidity.

The rotational speed of the adsorbent wheel may be adjusted according to the amount of purity and reheat efficiency sought.

DETAILED DESCRIPTION OF THE DRAWINGS

FIG. 1 shows a desiccant wheel air brake dryer together with other components of a truck or other large vehicle having an air brake system. Ambient air is brought in as air flow 2 and passes through an air filter 4 to remove particulate impurities. Clean air 6 passes through a turbocharger or super charger 8 to increase the air pressure. Higher pressure air flow 10 now is cooled in an intercooler 12 and the majority of cooled higher pressure air flow 14 passes to an engine 16. A minor portion of the cooled higher pressure air flow 14 is split off from the air flow 14 and is shown as air flow 18. The air flow 18 now passes through an adsorption sector 22 of a desiccant wheel 20. Moisture is removed by the adsorbent contained in the adsorption sector 22. The air flow continues as air flow 26 and goes into a compressor 30 to be compressed and to exit as compressed air flow 34. A portion of the air flow 26 is diverted to be regeneration air flow 28 that is sent to a heat exchanger 32 to be heated sufficiently for its function. As shown in this FIG. 1, the compressed air flow 34, which has been heated by virtue of being compressed, provides the heat at the heat exchanger 32 to heat the regeneration air flow 28 which leaves the heat exchanger 32 as air flow 40 to contact a regeneration sector 24 of the desiccant wheel 20 in a direction countercurrent to the air flow 18 contacting the adsorption sector 22. Also shown is clean, compressed air 36 exiting the heat exchanger 32 and passing to a brake system 38. Not shown in the drawing are storage tanks for the compressed air to be stored for use as needed during braking operations.

Figure 2:
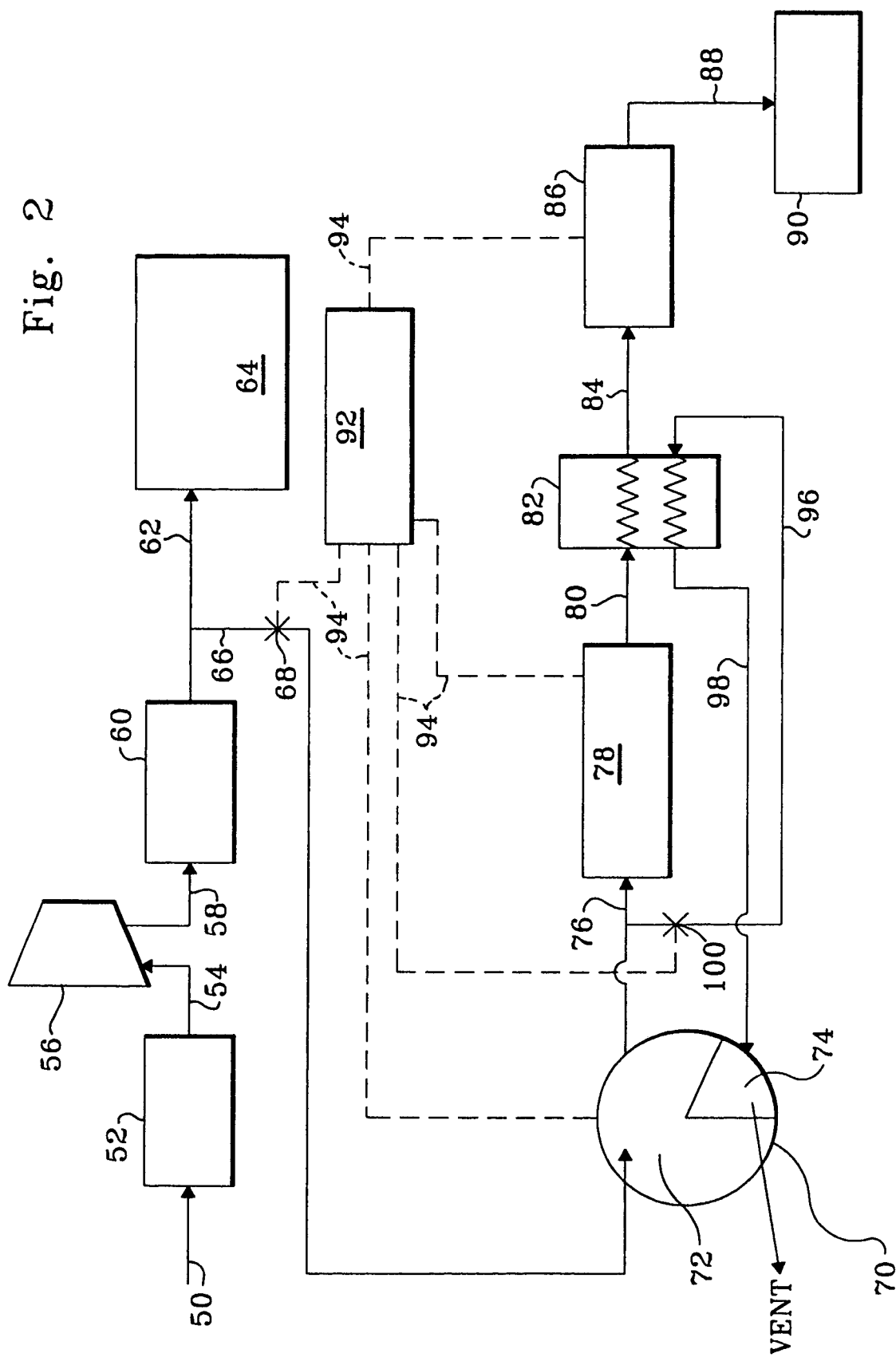
FIG. 2 shows a desiccant wheel air brake dryer together with other components of a truck or other large vehicle having an air brake system.

FIG. 2 shows a desiccant wheel air brake dryer together with other components of a truck or other large vehicle having that has an air brake system. Ambient air is brought in as air flow 50 and passes through an air filter 52 to remove particulate impurities. Clean air 54 passes through a turbocharger or super charger 56 to increase the air pressure. Higher pressure air flow 58 now is cooled in an intercooler 60 and the majority of cooled higher pressure air flow 62 passes to an engine 64. A minor portion of the cooled higher pressure air flow is split off from the air flow 62 and is shown as air flow 66. The air flow 66 now passes through an adsorption sector 72 of a desiccant wheel 70. Moisture is removed by the adsorbent contained in the adsorption sector 72. The air flow 66 continues as air flow 76 and goes into a compressor 78 to be compressed and to exit as compressed air flow 80. A portion of the air flow 76 is diverted to be a regeneration air flow 96 that is sent to a heat exchanger 82 to be heated sufficiently for its function as a regeneration air flow. As shown in this FIG. 2, the compressed air flow 80, which has been heated by virtue of being compressed, provides the heat at the heat exchanger 82 to heat the regeneration air flow 96 which leaves the heat exchanger 82 as air flow 98 to contact a regeneration sector 74 of the desiccant wheel 70 in a direction countercurrent to the air flow 66 contacting the adsorption sector 72. There are two valves, valve 68 to interrupt and resume the adsorbent air flow 66 and valve 100 to interrupt and resume the regeneration air flow 96. A controller 92 is shown to control the operation of an air brake system 90 as well as the air brake dryer through signals transmitted through wires 94. The controller obtains compressed gas pressure levels from a supply reservoir 86. When the compressed gas pressure is above a predetermined level, the compressor 78 and the desiccant wheel 70 can be sent a signal by the controller 92 to be idle. When they are idle, the valve 68 or the valve 100 will close so that all of the air flow can go to the engine 64 or the compressor 78, respectively. Also shown is clean, compressed air 84 exiting the heat exchanger 82 and passing to the supply reservoir 86 and then as needed through a line 88 to the brake system 90.

Figure 3:
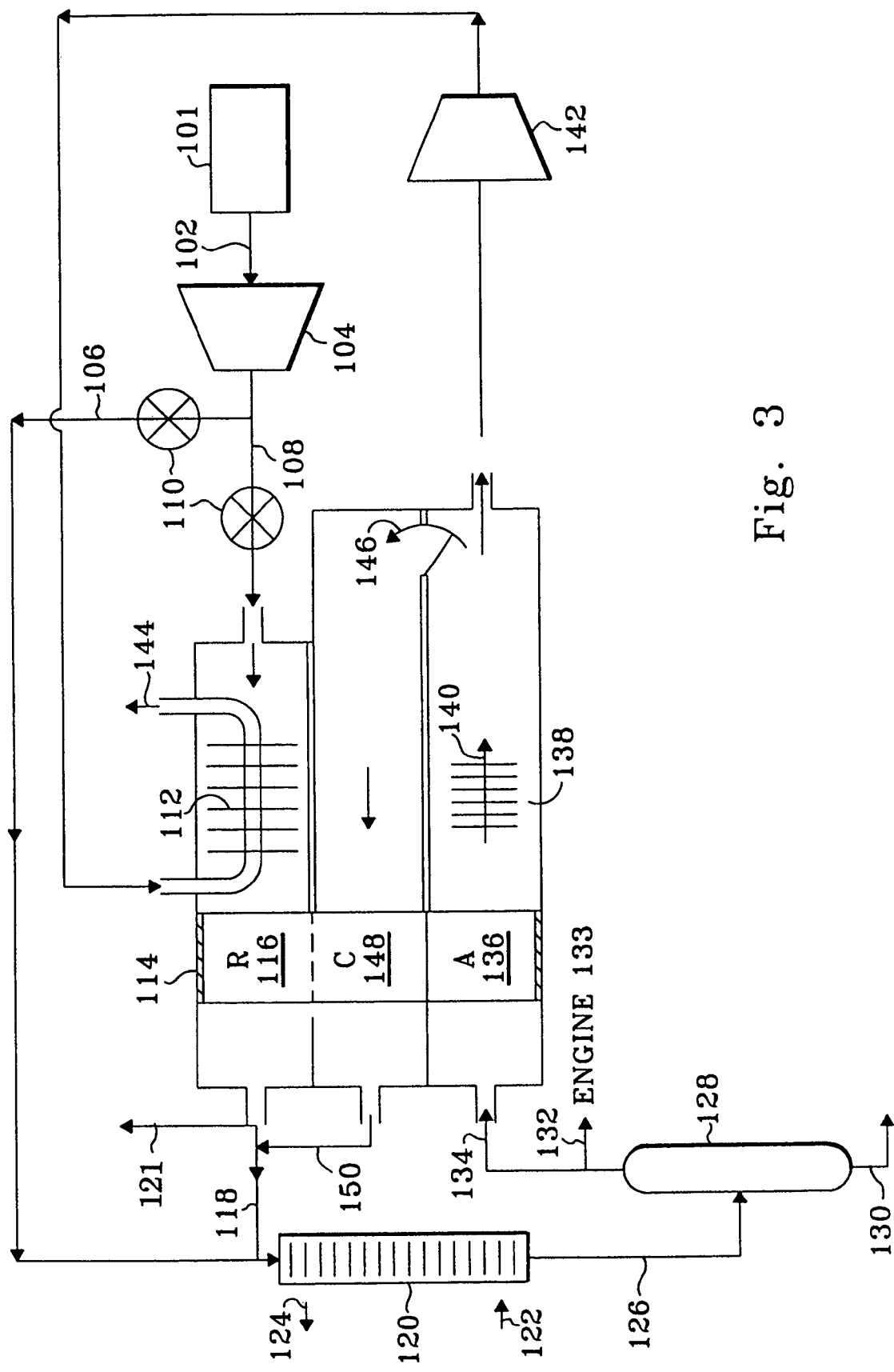
FIG. 3 shows a more detailed scheme of an air brake drying system together with other components.

Another view of the present invention is shown in FIG. 3. An example of the effectiveness of the present invention is provided in context of this figure. The design parameters of this example are that the wheel is 10 cm (4 inches) in diameter, with a 2.5 cm (1 inch) diameter hub. The distance through the wheel, or depth, is 14 cm (5.5 inch). The feed contains 3200 parts per million (ppm) water and the product of the air dryer contains 900 ppm water. The wheel will rotate at 12 revolutions per hour. In this example, the regeneration sector is 46% of the surface area, the cooling sector is 4% of the surface area and the adsorption sector is 50% of the surface area of the wheel. It has been calculated that under the same conditions, if the desiccant wheel were 40 cm thick, the product would contain 309 ppm water and if the desiccant wheel were 20 cm thick, the product would contain 587 ppm water. A flow of fresh air is brought into the system as air flow 102 after passing through an air filter 101. For the purposes of this example, this fresh air is at 32° C. (90° F.) having 32,000 ppm water. The air flow 102 is boosted in pressure to a level of 103 kPa (15 psig) and heated to 180° C. (356° F.) by passing through a turbocharger 104. Boosted air flow 108 is shown being sent to a regeneration sector 116 of a desiccant wheel 114. Valves 110 are shown to control the ratio of air sent to the air flow 108 with the majority of the air flow being shown as air flow 106 to eventually travel to the engine for combustion purposes. Air flow to the regeneration sector 116 is 25 SCFM. This air flow passes through a heat exchanger 112 to the regeneration sector 116 of the desiccant wheel 114 that is displayed in profile. In the example, the regeneration sector 116 comprises about 46% of the surface area of the desiccant wheel 114. After passing through the regeneration sector 116, air flow 118 is at a temperature of about 118° C. (244° F.) and contains about 50,000 ppm water. A part of the air flow 118 is bled at an outlet 121 from the system shown at a radiator 120, this flow is greater than 4 SCFM. The remaining air flow 118 is combined with the air flow 106 from the turbocharger 104. The air flow 106 is then cooled by passing through the radiator 120 and then leaving the radiator 120 as air flow 126. Arrows 122, 124 are shown to illustrate the circulation of fluid to the radiator 120. The air flow 126 goes through a condenser 128 where condensed water is removed as shown at an outlet 130. The majority of the air flow 126 from the condenser 128 is sent to a vehicle engine 133 as air flow 132 and a smaller air flow 134 (about 16 SCFM at 37° C. (100° F.)) is sent to an adsorption sector 136 of the desiccant wheel 114. The adsorption sector 136 comprises about 50% of the surface area of the desiccant wheel 114. Air flow 140 exiting the adsorption sector 136 is about 80° C. (177° F.) and contains about 900 ppm water. This air flow 140 is cooled further to about 37° C. (100° F.) by passing through a heat exchanger 138. About 25% of this air flow is diverted as cooling air flow 146 to pass through a cooling sector 148 of the desiccant wheel 114. This cooling sector 148 is a small portion of the surface area of the desiccant wheel 114, comprising about 4% of the surface area. The cooling air flow 146 exits the cooling sector 148 as air flow 150 and is shown as being combined with the air flow 118 that has exited the regeneration sector 116. The air flow 150 contains about 3530 ppm water and is about 88° C. (190° F.). The remaining portion of the air flow 140 is sent to be compressed by a compressor 142, then passing through the heat exchanger 112 and finally as air flow 144 to a compressed air storage tank (not shown).

What is claimed is:

1. An air brake system comprising:
  a) a source of fresh air communicating with a desiccant wheel, wherein said desiccant wheel comprises an axis of rotation, a radius perpendicular to said axis of rotation extending from said axis of rotation to an outer circumference, and two sides, and wherein said two sides are divided into at least two sectors, and wherein said sectors comprise at least an adsorption sector and a regeneration sector, wherein said fresh air passes through said adsorption sector to be dried and wherein said air brake system further comprises;
  b) an air compressor wherein said dried fresh air is compressed to a desired level; and
  c) a source of heated gas sent to said regeneration sector wherein water is removed from said desiccant wheel wherein said heated gas is heated by said compressed air.

2. An air brake dryer for a braking assembly comprising:
  a) a desiccant wheel comprising an axis of rotation, a radius perpendicular to said axis of rotation extending from said axis of rotation to an outer circumference, and two faces, wherein said two faces are each divided into at least two sectors, said sectors comprising an adsorption sector and a regeneration sector, wherein said adsorption sector is contacted with a moist flow of air that passes through said adsorption sector in a direction parallel to said axis of rotation, and wherein said adsorption sector comprises an adsorbent material to remove water from said air to produce dry air; and
  b) a source of heated air in communication with said regeneration sector to remove water from said regeneration sector of said desiccant wheel, wherein said dry air passes to an air compressor that compresses said dry air to a desired pressure level wherein said heated air is heated by said compressed air.

3. A process for producing dry compressed air for a vehicle's air brakes comprising:
  a) sending a flow of air to a vehicle air inlet;
  b) then sending said flow of air through an adsorption sector of a desiccant wheel to produce a dry flow of air;
  c) then sending said dry flow of air to an air compressor to produce a supply of compressed air; and
  d) storing said supply of compressed air for use in applying said vehicle's air brakes.

4. The process of claim 3 further comprising sending a heated flow of air through a regeneration sector of said desiccant wheel to remove adsorbed water.

5. The process of claim 3 wherein said heated flow of air receives its heat from said air compressor.

6. The process of claim 3 wherein a flow of air cooler than said heated flow of air is sent through a cooling sector of said desiccant wheel prior to said flow of air contacting said adsorption sector.

* * * * *